March 18, 1969    V. S. BELLINGER    3,432,958
FISHING POLE
Filed Oct. 24, 1965

INVENTOR
*Victor S. Bellinger.*

United States Patent Office 3,432,958
Patented Mar. 18, 1969

3,432,958
FISHING POLE
Victor Stanley Bellinger, 204 Leah St.,
Utica, N.Y. 13501
Filed Oct. 24, 1965, Ser. No. 504,738
U.S. Cl. 43—24
Int. Cl. A01k 87/04
3 Claims

ABSTRACT OF THE DISCLOSURE

This pole comprises an elongated tube to be slipped over the end of a fishing rod to a point in which one end of the tube is adjacent to the handle of the rod. A hook shaped bolt secures the rod to the tube near said end of the tube. The other end of the tube is secured to a tubular container which is substantially the same size as the tube at one end and larger at its other end to permit a fish to be drawn into the container by the line. An apertured plug extends across the tube near said other end and is adjustably secured to the tube. This plug is to be adjusted to a position in which the entire line and hook can be drawn into the container when storing the rod or moving it through brush or the like. The plug also limits the distance that the line can be drawn into the tube.

---

This invention relates to fishing tackle, and more particularly, to that piece of fishing tackle normally known in the art as a fishing rod. In this case it is called a fishing pole for reasons which will become obvious as the description of the invention proceeds along with an examination of the accompanying drawing.

Unfortunately, the average fishing rod or pole offers no protection to the fishing line which runs along the same from the reel secured at the handle. Anyone who has fished in a bushy-edged creek or river, or who has carried a fishing rod or pole, with a line secured thereto, through bushes or woods on the way to or from the fishing place, knows that the line will often become entangled in the overhanging bushes or branches of trees regardless of how carefully he proceeds.

It is, therefore, the principal object of this invention to provide a fishing pole of the character described that is hollow so that the fishing line will run through the same.

Another object of this invention is to provide a fishing pole of the character described that is easily and quickly secured to any ordinary fishing rod by means of a thumb screw, as will hereinafter be described.

Another object of this invention is to provide a fishing pole of the character described that is light in weight by reason of its fabrication from plastic or the like although it need not necessarily be limited to this or to any other material; in some cases it may be desirable to make it from a heavy material.

Another object of this invention is to provide a fishing pole of the character described that can be made telescopic, if so desired.

Still another object of this invention is to provide a fishing pole of the character described, having a tubular container on the outer end thereof in which game fish may be held after being caught. These and other objects of this invention will become more apparent as the description of the invention proceeds, and the accompanying drawing is examined.

Figure 6:
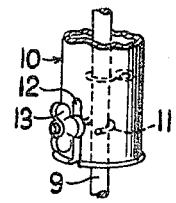
FIGURE 6 is an enlarged pictorial view of that part of this invention that is indicated by the arrowed line and numeral 6 on FIGURE 1.

In the drawing, where like parts are indicated by like reference numbers in the several views, the reference number 9 indicates a typical fishing rod over which a tubular fishing pole 10 is slipped and secured by means of the hook-shaped bolt 11 which projects outwardly through the elongated slot 12 that is in the lowermost end of the fishing pole 11. A wing nut 13 is now screwed onto the outwardly projecting end of the bolt 11, thereby firmly securing the fishing pole 10 to the fishing rod 9, as clearly shown in FIGURE 6 of the accompanying drawing.

Figure 3:
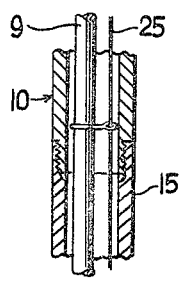
FIGURE 3 is an enlarged sectional view of that part of this invention that is enclosed within the arrowed circle and indicated by the numeral 3 on FIGURE 1.

The fishing pole 10 is composed of three sections: 14, 15, and 16. These are screwed together in the manner clearly shown in FIGURE 3 of the drawing. It should be noted at this time that while this device is called a fishing pole, it is, technically speaking, a fishing tube.

Figure 1:
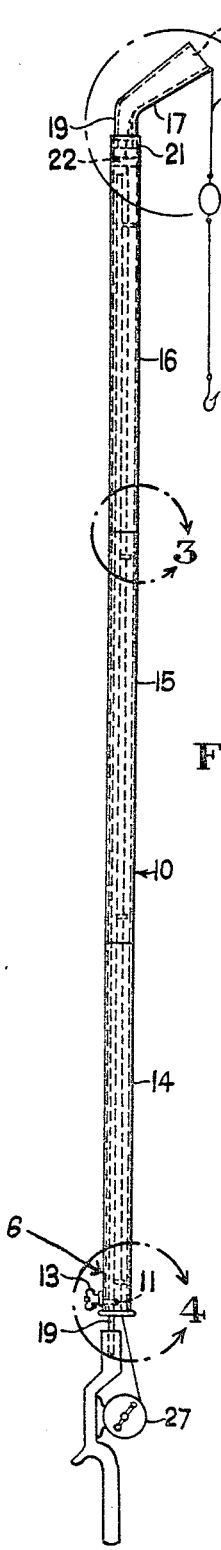
FIGURE 1 is a side view of this invention secured to a typical fishing rod.
Figure 2:
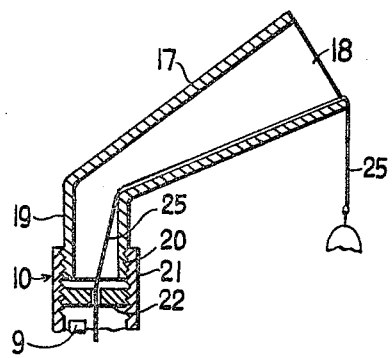
FIGURE 2 is an enlarged sectional view of that part of this invention that is enclosed within the arrowed circle and indicated by the numeral 2 on FIGURE 1.
Figure 5:
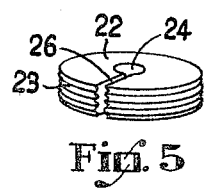
FIGURE 5 is an enlarged pictorial view of that part of this invention known as the plug.
Figure 4:
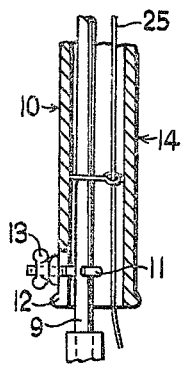
FIGURE 4 is an enlarged sectional view of that part of this invention that is enclosed within the arrowed circle and indicated by the numeral 4 on FIGURE 1.

Directing one's attention now to FIGURES 1 and 2 of the accompanying drawing, it will be seen that pole 10 is provided with a tubular angularly disposed container 17 that has a large open end 18 and a smaller end 19 which is at an angle with the open end 18. The small end 19 is provided with external threads 20 and is screwed into the internally threaded upper end 21 of the section 16, as clearly shown in FIGURE 2. The part which I call a plug 22, which is in effect a round flat disk, has external threads 23 and a centrally located opening 24 through which the fishing line 25 passes. It also has a radially disposed opening 26 that extends from the externally threaded periphery to the centrally located opening 24, as clearly shown in FIGURE 5. The purpose of the opening 26 in the plug 22 is to permit the pole 10 to be secured to any fishing rod 9 without first removing the line 25, thus saving considerable time when one is about to go fishing, or when one desires to secure this pole to a fishing rod. It is to be realized that the plug 22 can be adjusted to any desired distance from the fishing pole tip merely by screwing the plug up or down in the threaded upper end 21 of the section 16. For example, if the distance from the hook on the line to the last sinker is twelve inches, then the plug 22 will be so adjusted as to be thirteen inches from the large open end 18 of the container 17 in order that the hook may be placed inside the container 17 to prevent it from becoming caught in anything. The container 17 may be made in any desired size. A number of different size containers may be carried by the fisherman if he so desires. Fishing pole 10 may be made up of any number of lengths or sections according to one's needs, and it may be used with or without the previously noted fishing rod 9.

Although this fishing pole may be adapted to a fishing rod having any type of reel, it is recommended that the reel be an automatic one for two reasons: first, as soon as the slack in the line is taken, the line may easily be returned to the reel, and second, as soon as a fish is drawn into the container 17, the fishing line 25 is snubbed by the brake on the automatic reel, which is indicated in FIGURE 1 by the reference number 27.

What I now claim as new is:

1. A fishing pole of the character described, comprising a hollow pole embodying a plurality of hollow pole sections suitably secured together end to end in which a fishing line is placed; a container having one end secured to the outer end of the said hollow pole, the outer end of the said container being larger than that of its securing end, the said container providing a receptacle for the hook and sinkers on the said fishing line and for any fish that may be caught on the said hook; and means for preventing the said hook and sinkers from dropping back down inside the said hollow pole; and means for securing the said fishing pole to a typical fishing rod when the said hollow pole is placed over the said fishing rod.

2. A fishing pole of the character described, comprising a hollow pole embodying a plurality of hollow pole sections suitably secured together end to end in which a fishing line is placed; a container having one end secured to the outer end of the said hollow pole, the outer end of the said container being larger than that of its securing end, the said container providing a receptacle for the hook and sinkers on the said fishing line and for any fish that may be caught on the said hook; and means for preventing the said hook and sinkers from dropping back down inside the said hollow pole; and a hook-shaped bolt located inside the lowermost end of the said hollow pole, the said hook-shaped bolt being adapted to encompass in part a fishing rod over which the said hollow pole may be placed; and a wing nut screwed onto the outer end of the said hook-shaped bolt that projects through an elongated slot in the said hollow pole, the said wing nut thereby being adapted to secure the said hollow pole to the said fishing rod.

3. A fishing pole of the character described, comprising a hollow pole embodying a plurality of hollow pole sections screwed together end to end in which a fishing line is placed; a container having one end secured to the outer end of the said hollow pole, the outer end of the said container providing a receptacle for the hook and sinkers on the said fishing line and for any fish that may be caught on the said hook; and means for preventing the said hook and sinkers from dropping back down inside the said hollow pole; and a hook-shaped bolt located inside the lowermost end of the said hollow pole, the said hook-shaped bolt being adapted to encompass in part a fishing rod over which the said hollow pole is to be placed; and a wing nut screwed onto the outer end of the said hook-shaped bolt that projects through an elongated slot in the said hollow pole, the said wing nut thereby being adapted to secure the said hollow pole to the said fishing rod.

References Cited

UNITED STATES PATENTS

| | | | |
|---|---|---|---|
| 2,327,990 | 8/1943 | Benson. | |
| 2,578,663 | 12/1951 | Beaupre | 43—18 |
| 3,279,115 | 10/1966 | Worsham | 43—19 |
| 3,325,938 | 6/1967 | Minera | 43—24 |

FOREIGN PATENTS 1,385,014  11/1964  France.

SAMUEL KOREN, *Primary Examiner.*

DANIEL J. LEACH, *Assistant Examiner.*

U.S. Cl. X.R.

43—25.2, 25, 18